Figure 1:
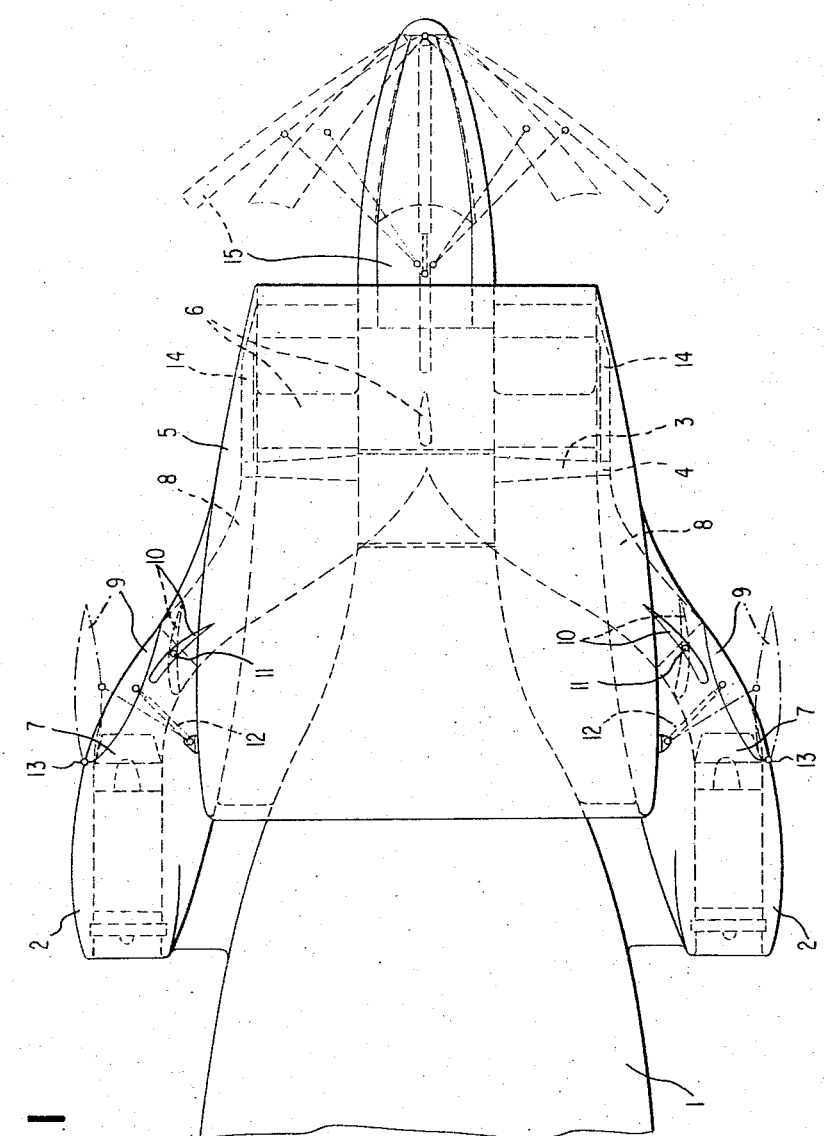

Jan. 30, 1968   F. HOFFERT ET AL   3,366,350

PROPULSION UNIT FOR AIRCRAFT

Filed Aug. 9, 1965   3 Sheets-Sheet 2

INVENTORS
FRITZ HOFFERT
HANS-JÜRGEN SCHNURR

BY *James E. Bryan*
ATTORNEY

Jan. 30, 1968   F. HOFFERT ET AL   3,366,350
PROPULSION UNIT FOR AIRCRAFT
Filed Aug. 9, 1965   3 Sheets-Sheet 3

INVENTORS
FRITZ HOFFERT
HANS-JÜRGEN SCHNURR

BY *James E. Bryan*
ATTORNEY 3,366,350
PROPULSION UNIT FOR AIRCRAFT
Fritz Hoffert, Friedrichshafen-Berg, and Hans-Jürgen Schnurr, Friedrichshafen-Fischbach, Germany, assignors to Dornier-Werke G.m.b.H., Friedrichshafen (Bodensee), Germany, a corporation of limited liability of Germany
Filed Aug. 9, 1965, Ser. No. 478,061
Claims priority, application Germany, Aug. 8, 1964, D 45,141
16 Claims. (Cl. 244—55)

The present invention relates to a propulsion unit for an aircraft, which unit includes a fan. In this type of propulsion unit, the tips of the fan blades have the form of turbine blades or vanes and are acted upon by the exhaust gas jets of, normally, several gas generators.

An aircraft is known which has a fan mounted at the tail thereof, the fan being driven by two gas generator units mounted within the fan housing or shroud. Such a propulsion unit has the disadvantage that in the case of damage to, or failure of, the fan, the unit becomes practically totally inoperative. The forward thrust of the gas generators or jet propulsion units, which are still operating, is generally reduced to such an extent by the turbine blades of the fan positioned in the path of the reactive gas jets that the unit no longer suffices to propel the aircraft.

The present invention provides an aircraft propulsion unit including at least two gas generators, which are mounted near the tail assembly of the aircraft, and a fan which is driven by the gas generators and also is mounted at the rear of the fuselage; the blade tips of the fan have the form of turbine blades. The jet propulsion units or gas generators are mounted substantially outside of the fan shroud or housing and the effective arc of action of the fan turbine is connected with the jet propulsion units by means of gas conduits. A fairing encloses the propellant gas nozzles of each of the jet propulsion units and is provided, in the extension of the gas stream exhausted from the gas nozzles, with an opening which may be closed by means of a flap. The propellant gas jets of the jet propulsion units may emerge in an unrestricted manner through these openings when necessary. As compared to known types this particular construction of an aircraft propulsion unit or arrangement has the special advantage that, in the event of a fan malfunction or failure, the jet propulsion units can operate in an unrestricted manner. The aircraft may be propelled either by the propellant gas streams or jets emerging from the nozzles of the jet propulsion units, or by the air blast of the fan, or by a combination of these propulsion means. Where the aircraft is propelled by the fan, the residual jet or propellant gas streams emerging from the fan turbine also are employed for propulsion.

The invention will be further illustrated by reference to the accompanying drawings in which—

Figure 2:
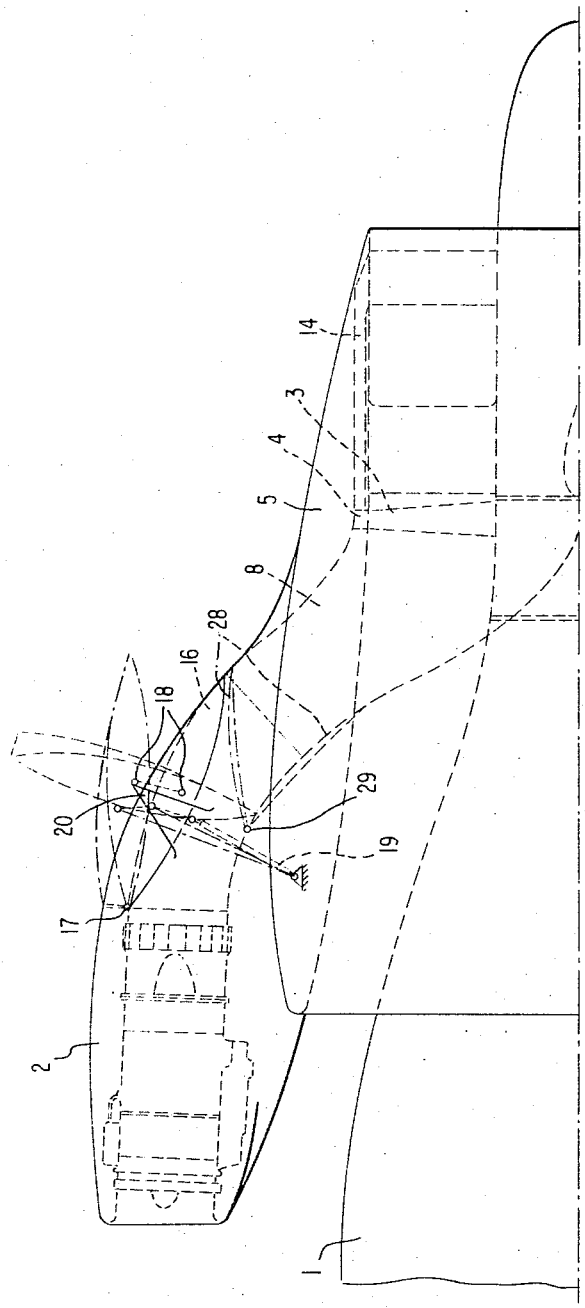
Figure 3:
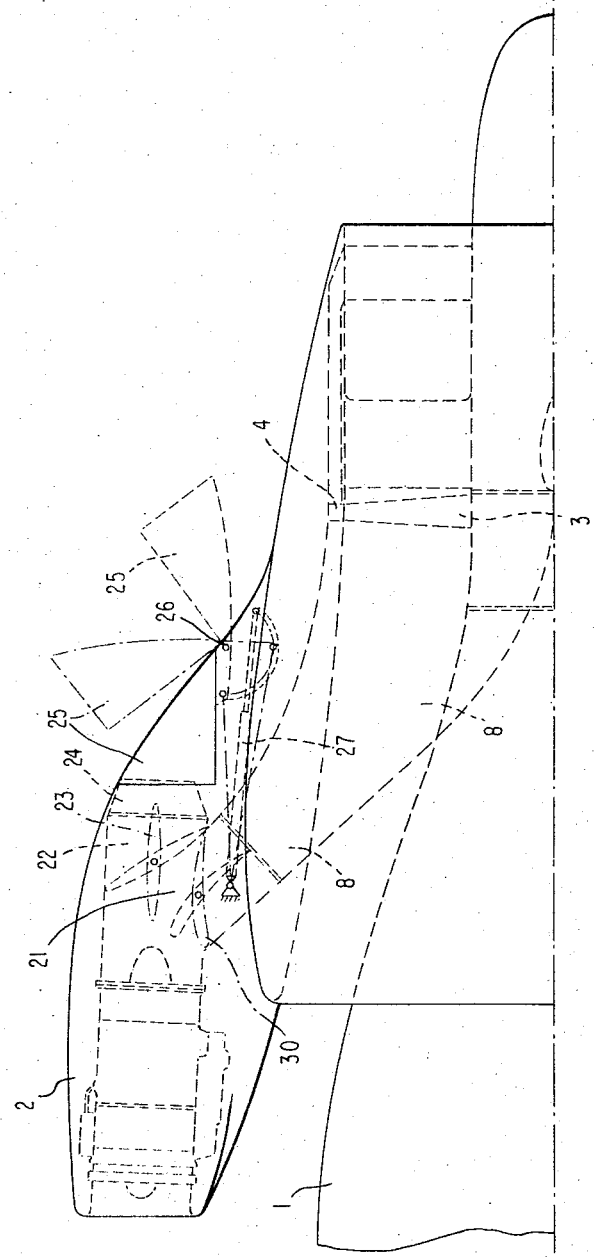

FIGURE 1 is a top plan view of the rear portion of an aircraft showing one embodiment of the propulsion unit of the present invention, FIGURE 2 is a top view of the right half of an aircraft rear portion showing another embodiment of the propulsion unit of the present invention, and FIGURE 3 is a top plan view of the right half of an aircraft rear portion showing another embodiment of the propulsion unit of the present invention.

Referring to FIGURE 1, there is shown a portion of an aircraft fuselage 1 having a jet propulsion unit 2 mounted on each side thereof. Mounted at the rear of the fuselage is a separate fan 3, the blade tips 4 of which have the form of turbine vanes or blades. The housing or shroud 5 of the fan 3 is secured to the rear of the fuselage and, in the rear portion thereof, is provided with the struts 6. The struts 6 serve to support the rear of the fuselage, which terminates in the shape of a cone, and which is interrupted by the fan 3, and into which the rear bearing of the fan is inserted. Each of the jet propulsion units 2 has an aerodynamic fairing which passes into the housing of the fan 3. Enclosed by the fairings of the jet propulsion units are the adjustable outlet nozzles 7 of the jet propulsion units 2 and openings are provided in the propulsion unit fairings for the unrestricted emergence of the propellant gases. These openings may be closed off or blocked by the shell- or dish-shaped flaps 9 which are operated by the hydraulic servomotors 12. The flaps 9 are pivotal about the pivot pins 13 mounted at the front edges thereof.

Enclosed in the fairings of the propulsion units 2 and the housing 5 of the fan 3 are the gas conduits 8. The gas conduits 8 may be provided with blocking valves which may consist, for example, of the flaps 10. The flaps 10 are rotatable about the axes 11 which are transversely positioned in the gas conduits. If it is desired to propel the aircraft directly by means of the propellant gas jets of the propulsion units 2, the openings in the propulsion unit fairings are uncovered, by pivoting the flaps 9 outwardly, and the gas conduits 8 are shut off or blocked by the flap valves 10. If it is desired to propel the aircraft by means of the air blast of the fan 3, the gas conduits 8 are opened and the openings in the propulsion unit fairings are closed. The adjustable outlet nozzles 7 are then opened to such an extent that the nozzle or jet effect thereof is eliminated. The gases from the propulsion units 2 are then supplied to the arc of action of the fan turbine by means of the gas conduits 8 and the aircraft is propelled by means of the air blast from the fan. Propellant gases which are not fully expanded are, in this case, also used for propulsion. The propellant gases passing through the annular channel 14 may be added to the air blast of the fan or they may emerge directly into free air.

The flaps 9 and 10 also may be locked in a position which is intermediate between the completely closed and completely open positions thereof. The propulsion of the aircraft will then occur directly by means of the propellant gases and by means of the air blast from the fan. Both the flaps 9 and the blocking or shut-off valves in the gas conduits 8 are so constructed that they will result in a deflection of the propellant gases into the gas conduits 8 with as low a loss as possible. The flaps 10 may have the shape of deflector blades, as shown. The shell- or dish-shaped flaps 9 have smooth concave inner surfaces and adjoin, at the terminal edges thereof, the front edges of the gas conduits 8. The outer surfaces of the flaps 9 form a portion of the surface of the fairings of the propulsion units and have no outwardly projecting parts which would adversely influence the air flow. The flaps 9 are shown in FIGURE 1 in the closed position and, in phantom, in the open position.

The flaps 9 and 10 may be separately actuated but it is also possible to couple them by means of known components so that the closing of the openings in the propulsion unit fairings produces a simultaneous opening of the blocking valves in the gas conduits, and vice versa. In the embodiment shown, the flaps 9 are pivotal about the pivot pins 13 mounted at the front ends thereof and serve primarily for closing off the propellant gas openings and for the deflection, in conjunction therewith, of the propellant gases into the gas conduits 8. As described below, the flaps of the propulsion unit fairings also may be employed for deflection of the gas jets, which is effected during landing operations for braking the aircraft.

FIGURE 1 illustrates a particularly effective jet deflection mechanism. Mounted at the rear of the fuselage, which terminates in the shape of a cone, are the braking flaps or air brakes 15 which may be opened to an umbrella-like configuration. When the braking flaps 15 are in the open position, the jet produced by the fan 3 is deflected in the forward direction. The braking flaps may be constructed in a very simple manner without losing any of their effectiveness and the number thereof may be varied in any desired manner. Under the first four braking flaps 15 shown in FIGURE 1, for example, another four may be arranged which are offset about 45° to the first four and which, when opened outwardly, fill the gaps between the first four flaps.

FIGURE 2 shows one half of a propulsion unit in which the flaps 16 of the propulsion unit fairings also may be utilized for the deflection of the propellant gas jets for the purpose of braking the aircraft. In this embodiment, each flap 16 has two pivot pins 17 and 18 which are successively operable, i.e., the first pin 17 is mounted at the front end of the flap and the flap 16 pivots about the pin 17, for the purpose of uncovering the opening in the propulsion unit fairing, to a position which is approximately parallel to the longitudinal axis of the propulsion unit. The second pin 18 is positioned approximately in the center of the flap and the flap pivots about the pin 18 into a position such that it deflects the propellant gas jet toward the front of the aircraft. The flap 16 is shown in FIGURE 2 in the position it occupies in the closed position and is shown, in phantom, in the position it occupies both when the opening in the fairing is uncovered, and in the position it occupies when employed to deflect the propellant gas jet.

The flap 16 is operated by two hydraulic servomotors 19. Starting from the closed position, the flap 16 pivots or swings about the pivot pin 17 outwardly until the journals of the pin 18 are seated in the bearings 20. The flap 16 will then assume a position approximately parallel to the longitudinal axis of the propulsion unit; the propellant gas jet of the propulsion unit is then unrestricted and may be employed for direct propulsion of the aircraft. A further pressure of the servomotor 19 on the flap 16 results in disengagement of the pivot pin 17 from its bearing support and the flap 16 pivots about the pivot pin 18. The rearward portion of the flap 16 is thereby pivoted into the propellant gas jet and the front portion is pivoted outwardly. In this position, the flap 16 will deflect the propellant gas jet toward the front of the aircraft. In this embodiment, the blocking valve means for the gas conduits 8 consists of the flaps 28 which pivot about the pins 29 mounted in the wall of the gas conduits.

A further embodiment of the propulsion unit of the invention is shown in FIGURE 3 and in this embodiment, the propulsion units 2 are mounted on the housing of the fan and are provided with openings or apertures 21 in the collector sections thereof. The gas conduits 8 begin at the openings 21, the conduits being provided with means whereby they may be blocked and are displaced forwardly, as compared to the conduits in the foregoing embodiments. The propulsion units 2 are provided with guide means 23 which supply the propellant gases selectively either to the propulsion unit nozzles 24 and/or to the gas conduits 8. The propulsion of the aircraft thus may again be produced either directly by the propulsion units, or by the fan, or by a combination of both, depending upon the positions occupied by the guide means and the gas conduit blocking means. The flaps 25 of the propulsion unit fairings do not, in this embodiment, guide the propellant gases into the gas conduits 8. They serve only as an aerodynamically favorable covering of the openings in the propulsion unit fairings, when the propulsion units operate only with the fan 3, and for the deflection of the propellant gases for braking purposes during landing. The blocking devices or valves 30 in the gas conduits 8, the guide means 23 for the propellant gases in the propulsion units 2 and the flaps 25 of the propulsion unit fairings may be coupled with each other so that when one of these devices occupies a particular position, the other two devices occupy specific positions in relation thereto. Each flap 25 is pivotal about a pivot pin 26 mounted at the terminal edge thereof and is operated by two lateral servomotors 27. In one position shown in phantom, the flap 25 is shown in the generally parallel position where the openings for the propellant gas jets are uncovered. The other position shown in phantom is that, generally at a right angle, occupied by the flap when the propellant gas jets are deflected.

It will be obvious to those skilled in the art that many modifications may be made within the scope of the present invention without departing from the spirit thereof, and the invention includes all such modifications.

What is claimed is:

1. A propulsion unit for an aircraft having a fuselage which comprises a forward propulsion fan enclosed in a forwardly-closed housing mounted on the fuselage, at least two jet propulsion units mounted substantially outside of the housing, gas conduit means for supplying gases from the jet propulsion units to the fan, the gas nozzles of each of the propulsion units being enclosed in a fairing having an opening therein at the exhaust end of the propulsion unit, and flap means for closing the opening, whereby said flap means are adapted in the open position to allow exhaust gases to pass directly to the atmosphere through said opening and in the closed position to direct said exhaust gases through said gas conduit means.

2. A propulsion unit according to claim 1 in which the fan contains blades, the tips of the latter having the form of turbine blades.

3. A propulsion unit according to claim 1 in which the jet propulsion units are mounted on the fuselage.

4. A propulsion unit according to claim 1 in which the jet propulsion units are mounted on the fan housing.

5. A propulsion unit according to claim 1 in which the gas conduits connect to the jet propulsion units at the rearward portion of the fairings.

6. A propulsion unit according to claim 1 in which the gas conduits connect to the jet propulsion units at the collector sections of the latter.

7. A propulsion unit according to claim 6 in which guide means are provided in the collector sections of the jet propulsion units, whereby propellant gases are selectively supplied to the nozzles of the propulsion units and to the gas conduits.

8. A propulsion unit according to claim 1 including means for blocking the gas conduits.

9. A propulsion unit according to claim 8 including means coupling the flap means with the means for blocking the gas conduits.

10. A propulsion unit according to claim 8 including means coupling the flap means, the means for blocking the gas conduits, and guide means in the collector sections of the jet propulsion units.

11. A propulsion unit according to claim 1 including means whereby the flap means can be utilized as a jet deflection flap.

12. A propulsion unit according to claim 1 in which the flap means is pivotal about a pivot pin mounted at one of the front and rear edges of the flap.

13. A propulsion unit according to claim 1 in which the flap means includes two successively operable pivot pins, the flap being pivotal about the first pin to a position approximately parallel to the longitudinal axis of the propulsion unit, and pivotal about the second pin to a position such that it deflects the gas jet from the propulsion unit.

14. A propulsion unit according to claim 1 including means whereby the flap means can be locked in any desired position between the completely open and completely closed positions thereof.

15. A propulsion unit according to claim 1 in which the flap means have smooth concave inner surfaces and, in the closed position, adjoin the front edges of the gas conduits.

16. A propulsion unit according to claim 1 including braking flaps mounted on the rear end of the fuselage, which flaps may be opened in an umbrella-like configuration.

References Cited

UNITED STATES PATENTS

| | | | |
|---|---|---|---|
| 2,620,622 | 12/1952 | Lundberg | 244—52 X |
| 3,154,917 | 11/1964 | Williamson | 60—39.16 X |
| 3,194,516 | 7/1965 | Messerschmitt | 60—35.6 |
| 3,087,691 | 4/1963 | Rainbow | 60—39.16 X |

FERGUS S. MIDDLETON, *Primary Examiner.*

MILTON BUCHLER, *Examiner.*

B. BELKIN, *Assistant Examiner.*